United States Patent
Choi

(10) Patent No.: US 7,896,026 B2
(45) Date of Patent: Mar. 1, 2011

(54) FILTER AND PRESSURE CONTROL VALVE OF ELECTRONICALLY CONTROLLABLE POWER STEERING APPARATUS INCLUDING THE SAME

(75) Inventor: Byung-yun Choi, Wonju (KR)

(73) Assignee: Mando Corporation, Gyeonggi-do (KR)

( * ) Notice: Subject to any disclaimer, the term of this patent is extended or adjusted under 35 U.S.C. 154(b) by 254 days.

(21) Appl. No.: 12/069,420

(22) Filed: Feb. 8, 2008

(65) Prior Publication Data
US 2008/0202605 A1   Aug. 28, 2008

(30) Foreign Application Priority Data
Feb. 14, 2007   (KR) .................. 10-2007-0015538

(51) Int. Cl.
*B62D 5/08* (2006.01)
*F16K 51/00* (2006.01)
(52) U.S. Cl. .................. 137/550; 251/337; 180/422; 180/441
(58) Field of Classification Search .................. 137/544, 137/545, 549, 550, 242; 180/441, 422, 442; 251/337
See application file for complete search history.

(56) References Cited

U.S. PATENT DOCUMENTS

| | | | | |
|---|---|---|---|---|
| 4,637,484 A * | 1/1987 | Ijiri et al. | ................... | 180/422 |
| 4,681,184 A * | 7/1987 | Suzuki et al. | ................ | 180/422 |
| 4,787,469 A * | 11/1988 | Yoshida et al. | ............... | 180/422 |
| 4,790,401 A * | 12/1988 | Sonoda | ........................ | 180/422 |
| 4,873,912 A * | 10/1989 | Schulze | ........................ | 91/389 |
| 4,899,842 A * | 2/1990 | Emori et al. | ................. | 180/422 |
| 4,955,446 A * | 9/1990 | Ooishi | ........................ | 180/423 |
| 4,995,970 A * | 2/1991 | Ohsakai | .................. | 210/167.01 |
| 5,092,418 A * | 3/1992 | Suzuki et al. | ................ | 180/441 |
| 5,447,209 A * | 9/1995 | Sasaki et al. | ................ | 180/422 |
| 5,531,286 A * | 7/1996 | Majer et al. | .................. | 180/441 |
| 5,687,810 A * | 11/1997 | Choi et al. | ................... | 180/441 |
| 6,105,711 A * | 8/2000 | Maruyama et al. | ........... | 180/421 |
| 6,382,148 B1 * | 5/2002 | Maeyama et al. | ......... | 123/90.15 |
| 6,523,566 B2 * | 2/2003 | Wynn, Jr. | ..................... | 137/550 |
| 6,892,759 B2 * | 5/2005 | Cornea et al. | ................ | 137/550 |
| 6,929,088 B2 * | 8/2005 | Wienecke | .................... | 180/441 |
| 7,000,633 B2 * | 2/2006 | Okada et al. | ................. | 137/550 |

FOREIGN PATENT DOCUMENTS

| | | | |
|---|---|---|---|
| JP | 2001-41349 | * | 2/2001 |
| KR | 10-0149355 | | 6/1998 |
| KR | 10-2007-0043321 | | 4/2007 |

* cited by examiner

*Primary Examiner*—John Rivell
(74) *Attorney, Agent, or Firm*—McDermott Will & Emery LLP

(57) ABSTRACT

A filter includes top and bottom support frames, and one or more middle support frames, which are arranged in such a manner that a second stepped area recessed by a predetermined depth from the outer circumferential surfaces of the top and bottom support frames is formed by the top and bottom support frames and the middle support frames. A pressure control valve of an electronically controllable power steering apparatus includes: a hollow valve body having a first stepped area with a predetermined depth, the first stepped area being formed on the outer circumferential surface of the valve body, where a supply port is formed; and the above-mentioned filter, the filter being fitted in the first stepped area of the valve body. The filter can minimize change of pressure at the filter area while assuring smooth supply of the hydraulic fluid, and can reduce the number of parts, the number of fabricating steps, and the material costs of such a pressure control valve.

7 Claims, 6 Drawing Sheets

FILTER AND PRESSURE CONTROL VALVE OF ELECTRONICALLY CONTROLLABLE POWER STEERING APPARATUS INCLUDING THE SAME

CROSS-REFERENCE TO RELATED APPLICATION

This non-provisional application claims priority under 35 U.S.C §119(a) on Patent Application No. 10-2007-0015538 filed in Korea on Feb. 14, 2007, the entire contents of which are hereby incorporated by reference.

BACKGROUND OF THE INVENTION

1. Field of the Invention

The present invention relates to a filter and a pressure control valve including the same, and more particularly to a pressure control valve of an ECPS (Electronically Controllable Power Steering) apparatus for controlling the highest reaction pressure of hydraulic fluid acting on a hydraulic pressure reaction part, wherein the pressure control valve prevents the blockage of a filter area for removing foreign matters from the hydraulic fluid supplied from a supply port, thereby ensuring smooth supply of the hydraulic fluid while minimizing change of pressure at the filter area, and the pressure control valve makes it possible to reduce the number of parts, the number of fabricating steps, and the material costs of such a pressure control valve.

2. Description of the Prior Art

As generally known in the art, an ECPS apparatus is a means for controlling the supply of steering power according to a vehicle speed so as to maintain steering stability at a high vehicle speed, and is employed so as to solve a problem with a conventional hydraulic steering wheel which is supplied with the same level of steering power regardless whether the vehicle speed is high or low, thus becoming excessively light at a high vehicle speed.

FIG. 1 is a schematic view showing a construction of a conventional ECPS apparatus, FIG. 2a is a vertical cross-sectional view showing a side of a flow path switching valve, and a PCV (Pressure Control Valve) of a conventional ECPS apparatus, and FIG. 2b is a perspective view showing a filter of a conventional PCV.

As shown in the drawings, a conventional ECPS apparatus of a vehicle includes a hydraulic pump 103 driven by a vehicle engine (not shown), a flow path switching valve 100 for switching flow paths of hydraulic fluid according to a relative displacement between an input shaft 205 and a pinion shaft 210, an actuating cylinder 105 for supplying steering power through the hydraulic fluid transferred from the flow path switching valve 100, a vehicle speed sensor 107 for sensing the vehicle speed, an electronic control device 109 for receiving electric signals from the vehicle speed sensor 107, and a pressure control valve 150 provided at a side of the flow path switching valve 100 so as to control the supply of hydraulic fluid to the hydraulic pressure reaction part 215 under the control of the electronic control device 109.

In such an ECPS apparatus, when a driver manipulates a steering wheel 113, a steering shaft 115 is rotated, and the input shaft 205 connected to the steering shaft 115 via a universal joint 117 is related while being relatively displaced in relation to the pinion shaft 210, so that hydraulic fluid is selectively supplied to the actuating cylinder 105, whereby steering power is applied to a rack bar 119.

In addition, the conventional pressure control valve 150 includes a hollow valve body 251 having a discharge port 220 and a supply port 225 formed in the peripheral wall thereof, a spool 253 slidably fitted in the valve body 251 and having a flow path 257 communicating with the supply port 225, the flow path 257 being formed in the body of the spool 253 and opened downward, an elastic member 255 provided on the top of the spool 253, a cap 235 provided on the bottom of the spool 253, and a second valve 270 provided below the cap 235.

In some cases, the pressure control valve 150 may not include the above-mentioned second valve 270. In that event, the flow path 257 of the pressure control valve 150 is not connected to the second valve but directly connected to a reaction port 233 of a valve housing 240, and hence to the hydraulic pressure reaction part 215.

The valve body 251 is formed in a hollow cylindrical shape with a constant diameter, and has a supply port 225 and a discharge port 220 formed in its peripheral wall, wherein a filter 250 is provided over the inlet side of the supply port 225 so as to filter foreign matters flowing into the pressure control valve together with the hydraulic fluid, and a blockage prevention groove 263 is formed around the valve body 251, the blockage prevention groove 263 having a predetermined depth recessed from the outer peripheral surface thereof into the inside of the supply port 225.

In addition, because the flow path of the pressure control valve 150 is opened at the bottom side of the spool 253, the hydraulic fluid supplied through the supply port 225 is transferred to the second valve 270 formed below the spool 253. Furthermore, because the hollow cap 235 communicating with the flow path 257 is provided on the bottom of the spool 253, the spool 253 is prevented from being released from the valve body 251.

Here, the second valve 270 includes a second valve body 271 which is hollow and has a reaction port 230 formed in the peripheral wall of the second valve body 271, a second spool 272 slidably fitted in the second valve body 271 and having a second flow path 274 communicating with the reaction port 230, the second flow path 274 being formed in the second spool 272 and opened at the top of the second spool 272, a second elastic member 273 provided on the top of the second spool 272, and a solenoid 275 provided on the bottom of the second spool 272.

In the above-mentioned second valve 270, the hydraulic fluid supplied through the flow path 257 flows through the second flow path 274 and to the reaction port 230, thereby being transferred to the hydraulic pressure reaction part 215, and the solenoid 275 moves the second spool 272 axially upward or downward, depending on the vehicle speed, whereby the second valve 270 serves as a means for adjusting the amount of hydraulic fluid supplied to the hydraulic pressure reaction part 215.

The elastic member 255 is interposed between the top of the spool 253 and the inner top of the valve body 251, thereby exerting elastic force biasing the spool 253 axially downward, wherein when the pressure of the hydraulic pressure is larger than the elastic force, the spool 253 is moved axially upward, and when the pressure of the hydraulic pressure is smaller than the elastic force, the spool 253 is moved axially downward, so that the flow path 257 communicates with the supply port 225 or is blocked from the supply port 225, whereby the flow of the hydraulic fluid can be controlled.

A support 259 is provided on the top of the elastic member 255 of the valve body so as to support the elastic member 255, and a control plug 252 is screwed into the top opening of the valve body 251.

The filter 250 consists of one or more support frames 256 and one or more filter screens 258. Although the blockage prevention groove 263 is provided on the valve body, the supply port 225 may be blocked if foreign matters are accumulated at an area where the filter 250 for removing foreign matters from the hydraulic fluid supplied to the supply port 225 and a supply port 217 of the valve housing are abutted with each other, or the supply port 225 may be directly blocked by the filter frames 265. In addition, because the valve body has the control plug 252 screwed into it, the number of parts and the number of fabricating steps of such a pressure control valve are increased.

SUMMARY OF THE INVENTION

Accordingly, the present invention has been made to solve the above-mentioned problems occurring in the prior art, and an object of the present invention is to provide a pressure control valve including a filter for removing foreign matters from hydraulic fluid supplied from a supply port, wherein a filter support frame is prevented from blocking the supply port so as to assure smooth supply of hydraulic fluid and to minimize change of pressure at a filter area, and the pressure control valve makes it possible to reduce the number of parts, the number of fabricating steps, and the material costs of such a pressure control valve.

In order to accomplish this object, there is provided a filter employed in a pressure control valve of an electronically controllable power steering apparatus, including top and bottom support frames, and one or more middle support frames, which are arranged in such a manner that a second stepped area recessed by a predetermined depth from the outer circumferential surfaces of the top and bottom support frames is formed by the top and bottom support frames and the middle support frames.

In accordance with another aspect of the present invention, there is provided a pressure control valve of an electronically controllable power steering apparatus, including: a hollow valve body having a first stepped area with a predetermined depth, the first stepped area being formed on the outer circumferential surface of the valve body, where a supply port is formed; and a filter fitted in the first stepped area of the valve body, the filter having top and bottom support frames, and one or more middle support frames, which are arranged in such a manner that a second stepped area recessed by a predetermined depth from the outer circumferential surfaces of the top and bottom support frames is formed by the top and bottom support frames and the middle support frames.

BRIEF DESCRIPTION OF THE DRAWINGS

The above and other objects, features and advantages of the present invention will be more apparent from the following detailed description taken in conjunction with the accompanying drawings, in which:

FIG. 2b is a perspective view showing a filter of the conventional pressure control valve of FIG. 2a;

FIG. 3b is a perspective view showing a valve body of the pressure control valve of FIG. 3a; and FIG. 3c is a perspective view showing a filter of the pressure control valve of FIG. 3a.

DETAILED DESCRIPTION OF THE PREFERRED EMBODIMENTS

Figure 1:
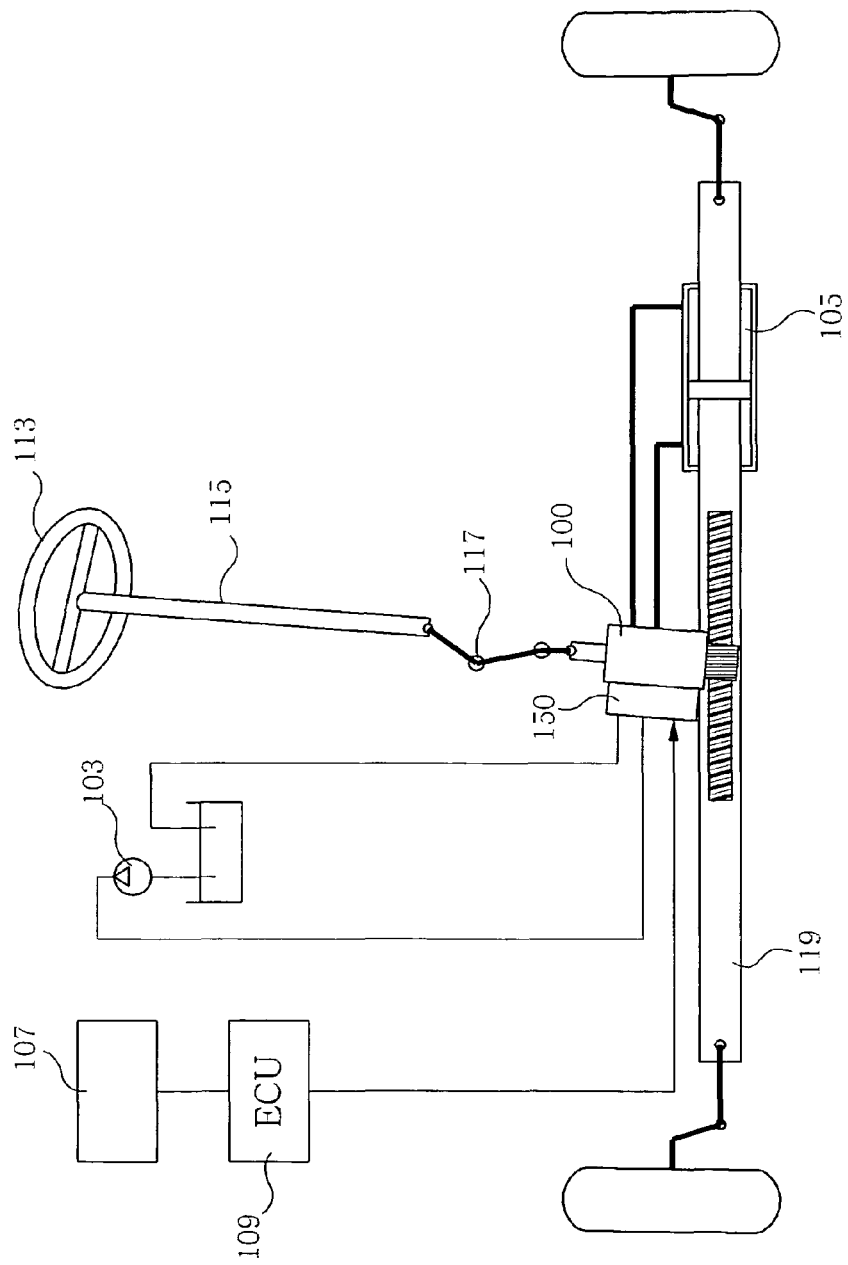
FIG. 1 is a schematic view showing a construction of a conventional electronically controllable power steering apparatus.

Hereinafter, a preferred embodiment of the present invention will be described with reference to the accompanying drawings. In the following description and drawings, the same reference numerals are used to designate the same or similar components, and so repetition of the description on the same or similar components will be omitted.

Figure 3A:
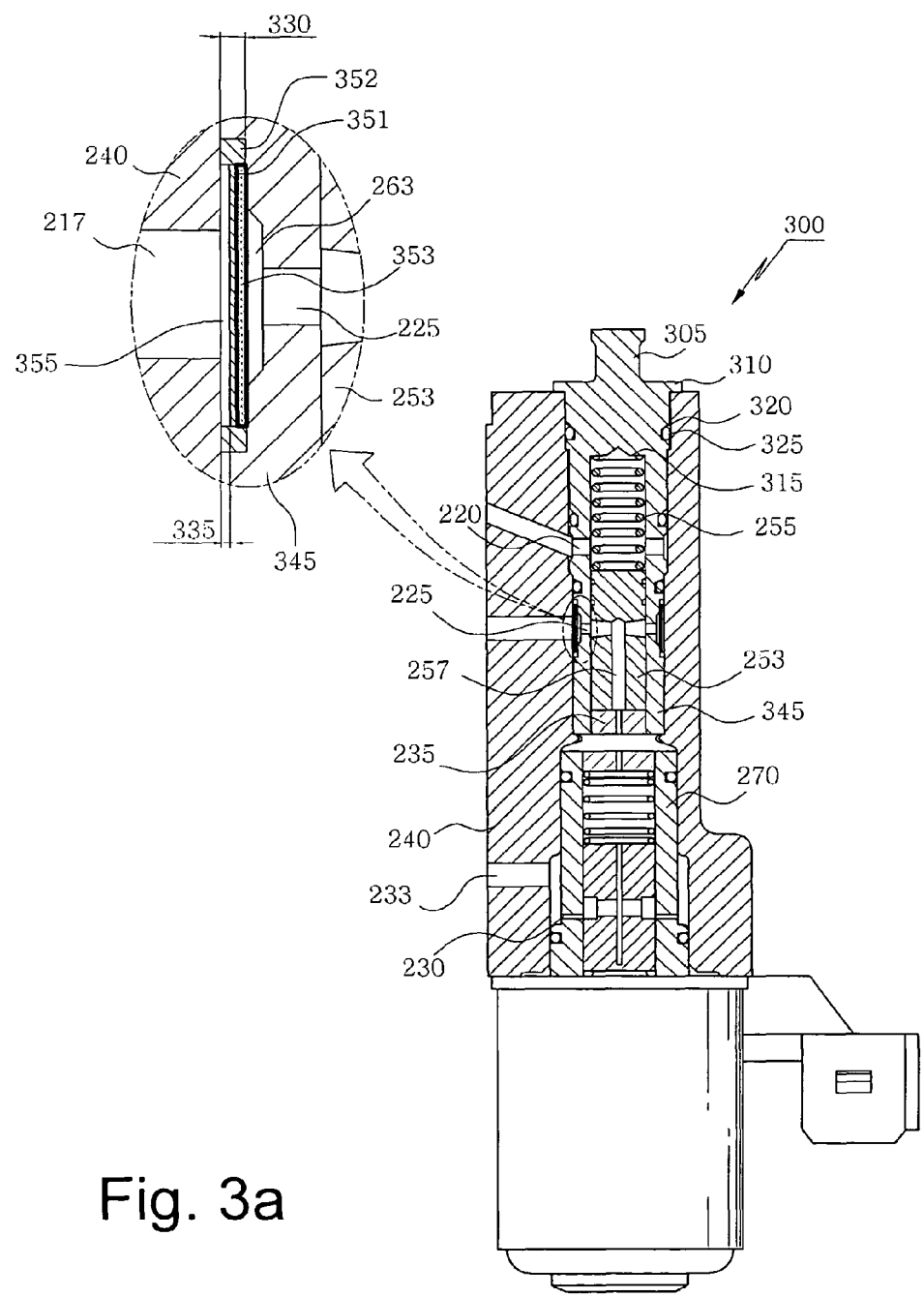
FIG. 3a is a vertical cross-sectional view showing a pressure control valve of an electronically controllable power steering apparatus according to an embodiment of the present invention.
Figure 3B:
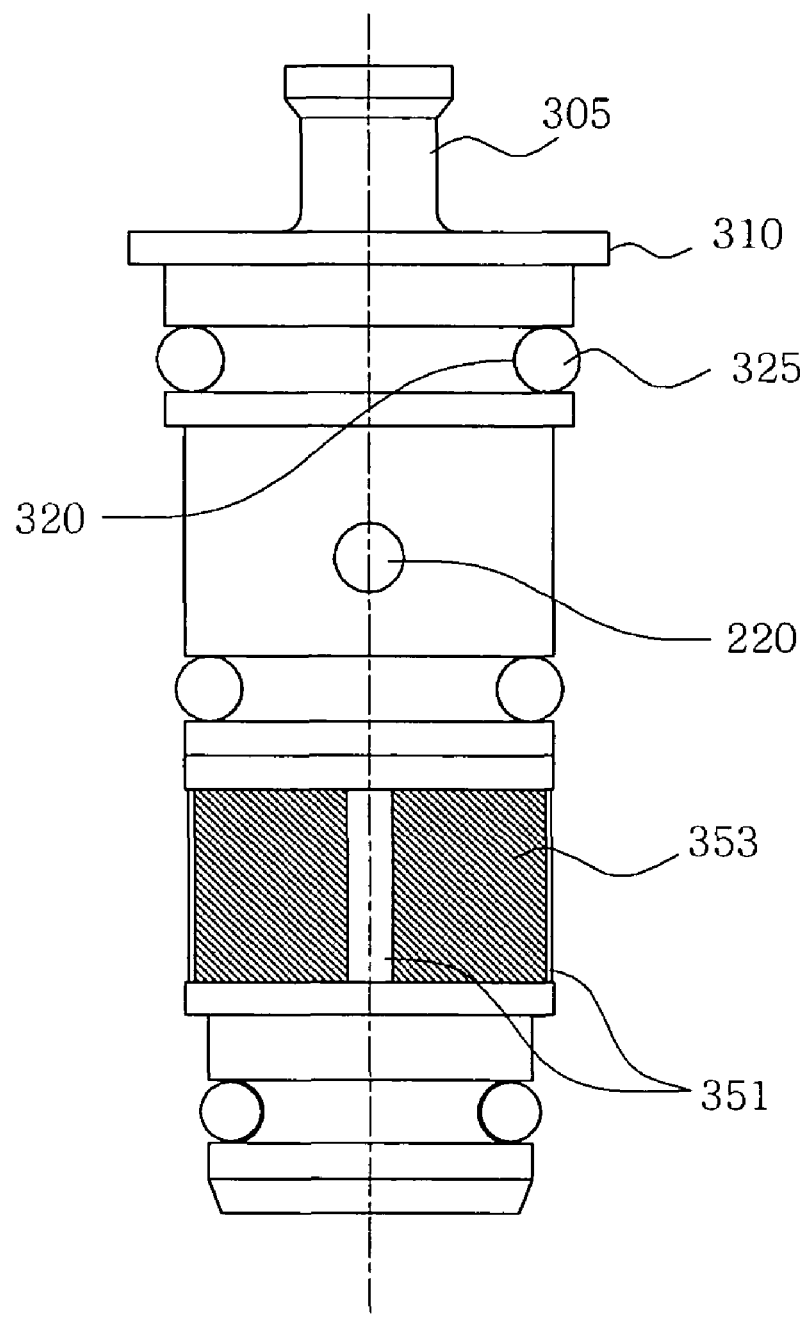
Figure 3C:
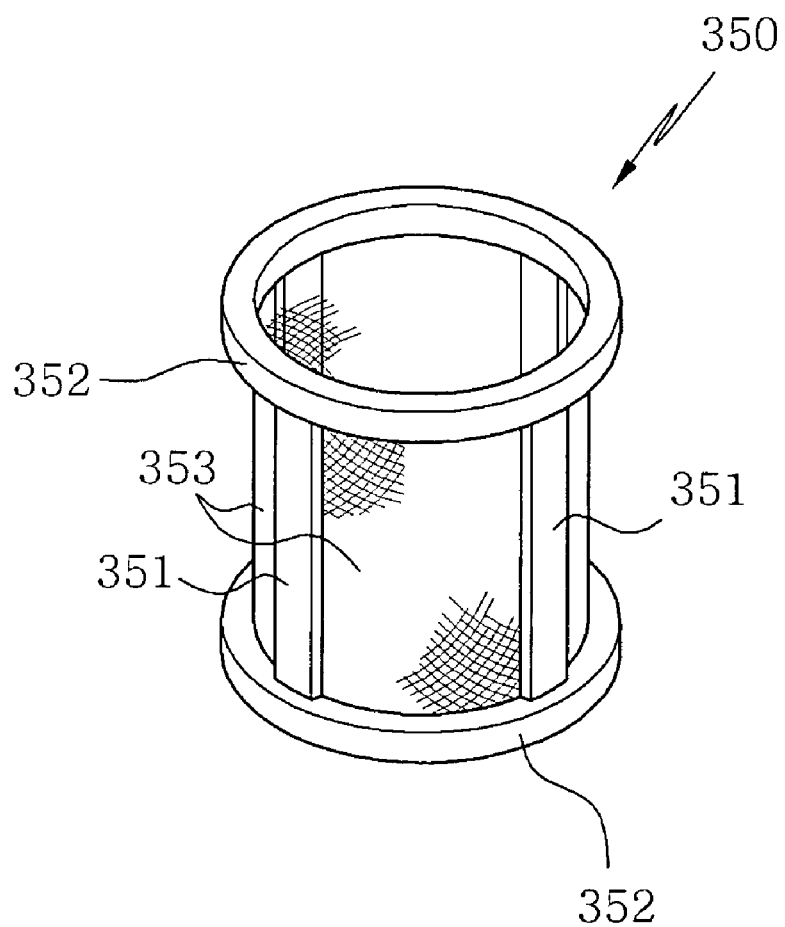

FIG. 3a is a vertical cross-sectional view showing a pressure control valve of an electronically controllable power steering apparatus according to an embodiment of the present invention, FIG. 3b is a perspective view showing a valve body of the pressure control valve of FIG. 3a, and FIG. 3c is a perspective view showing a filter of the pressure control valve of FIG. 3a.

As shown in the drawings, the filter 350 according to the present embodiment includes top and bottom support frames 352, and one or more middle support frames 351 interposed between the rims 252, the top and bottom support frames 352 and the middle support frames 351 being arranged in such a manner that a second stepped area is formed with a predetermined depth inwardly recessed from the outer circumferential surfaces of the top and bottom support frames 352.

In addition, the pressure control valve 300 according to the present embodiment includes a hollow valve body 345 having a supply port 225 formed in the peripheral wall thereof and a first stepped area 330 with a predetermined depth, the first stepped area 330 being formed on and recessed from the outer peripheral surface of the hollow valve body 345, and the above-mentioned filter 350 is fitted in the first stepped area 330.

The pressure control valve 300 may occasionally include a second valve 270. Because the second valve 270 is substantially identical to the above-mentioned conventional second valve, the description of the second valve 270 will be omitted.

The inventive valve body 345 is formed in a cylindrical hollow shape with a constant diameter, and has a supply port 225 and a discharge port 220 formed in the peripheral wall thereof, wherein the inventive valve body 345 is closed at the top of the elastic member, unlike the prior art. The supply port 225 serves as a passage for the hydraulic fluid supplied from a hydraulic pump, and the discharge port 220 serves as a discharge passage for returning the hydraulic fluid to an oil tank.

Figure 2A:
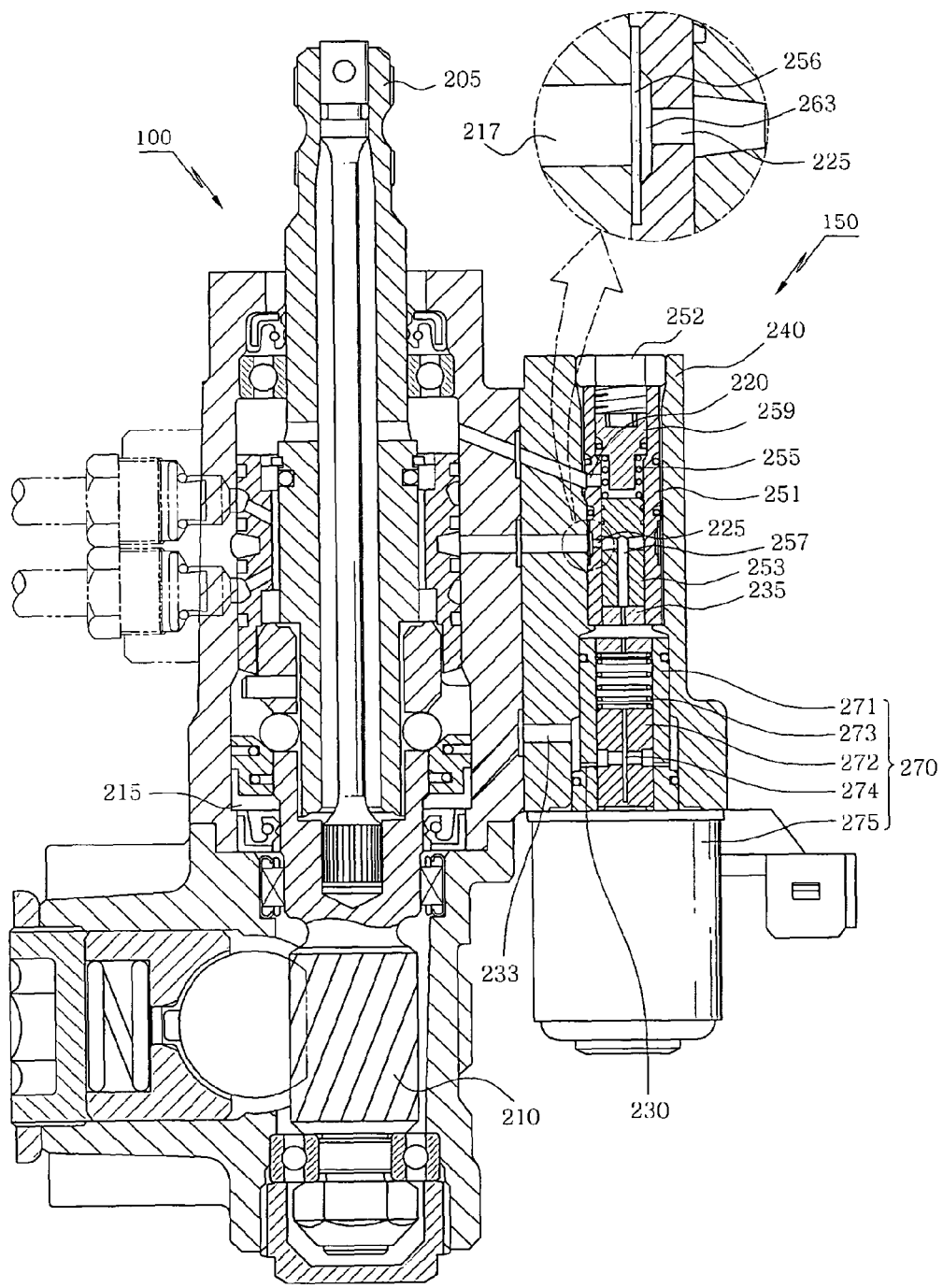
FIG. 2a is a vertical cross-sectional view showing a side of a flow path switching valve, and a pressure control valve of a conventional ECPS apparatus.
Figure 2B:
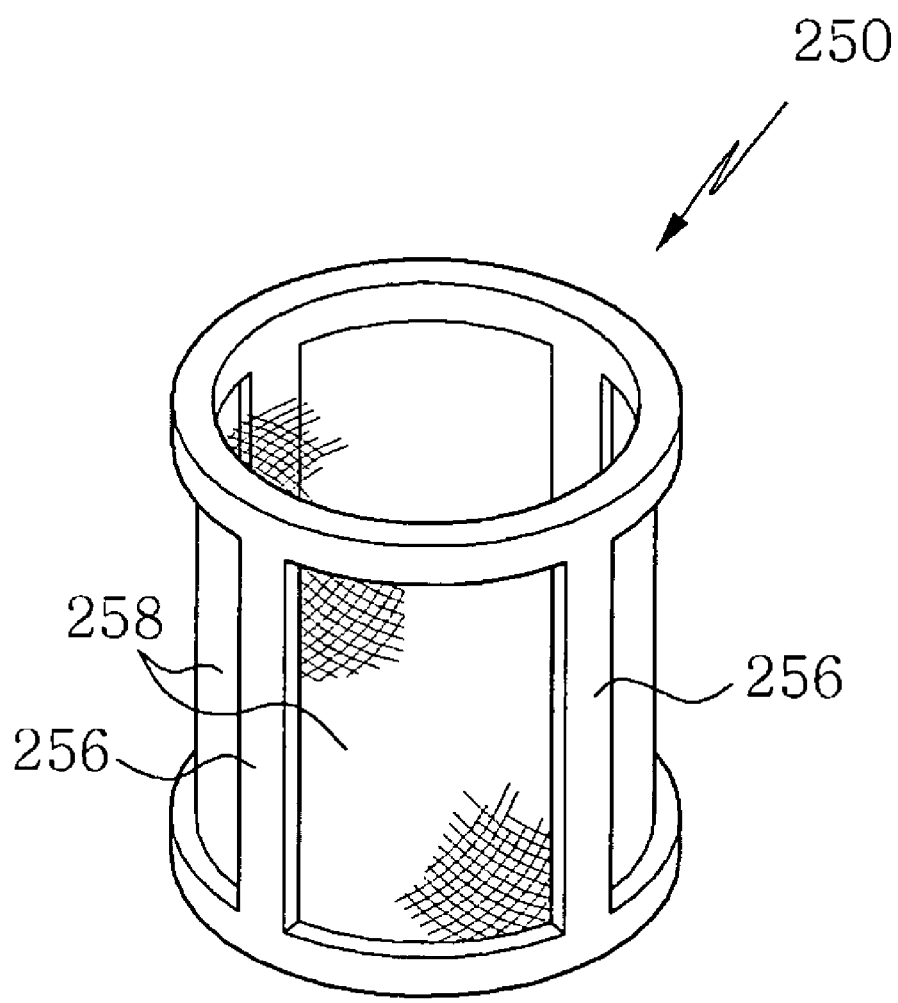

The inventive valve body 345 is closed at the top thereof, unlike the conventional valve body (indicated by reference numeral 151 in FIG. 2), which is opened at the top of the elastic member so that a control plug is screwed into the valve body. Instead of excluding a control plug (such as that indicated by reference numeral 252 in FIG. 2) and a support (such as that indicated by reference numeral 259 in FIG. 2) so as to reduce the number of parts, the number of fabricating steps, and the material costs of such a pressure control valve, the inventive valve body 345 has a grip part 305 and an anchoring part 315, which are integrally formed with the valve body 345, the anchoring part 315 serving as a support for supporting the elastic member.

That is, for the convenience of assembling the valve body 345 to the valve housing 240, the grip part 305 is formed on the top of the valve body in a protuberance shape extending outwardly. As a result, it is easy to press-fit the valve body 345 into the valve housing 240, and the anchoring part 315 is formed at the internal top of the valve body in a flat annular shape, so that the elastic member 255 is seated on and supported by the anchoring part 315.

An engagement part 310 is formed around the top end of the valve body 345, where the grip part 305 projects, thereby allowing the valve body 345 to rest in the valve housing. In addition, an O-ring groove 320 is formed on the outer periphery of the valve body inserted into the valve housing 240, an O-ring 325 being fitted in the O-ring groove 325 so as to preventing hydraulic oil from leaking through a gap between the outer periphery of the valve body and the inner periphery of the valve housing.

Meanwhile, the first stepped area 330 with a predetermined depth recessed from the outer peripheral surface of the valve body is formed around the supply port 225, so that the filter for removing foreign matters from hydraulic fluid is fitted in the first stepped area 330.

In addition, because the filter 350 surrounding the valve body 345 is also formed with the second stepped area 335 having a predetermined depth from the outer circumferential surfaces of the top and bottom support frames 352 of the filter 350, a space 355 is formed between the supply port 217 of the valve housing, and the middle support frames 351 and the filter screen 353 of the filter 350. As a result, the accumulation of foreign matters and the change of supply pressure of hydraulic fluid can be prohibited, whereby it is possible to avoid an error in pressure control.

That is, the filter 350 consists of one or more filter screens 353, top and bottom support frames 352, and one or more middle support frames 351, wherein each of the top and bottom frames 352 is formed in an annular shape, two or more middle support frames 351 interconnect the top and bottom support frames 352, and a filter screen 353 is mounted in each of the rectangular spaces formed by the top and bottom frames 353 and 352 and the middle supports 351. In addition, because the thickness of the middle support frames 351 is smaller than that of the top and bottom support frames 352, a stepped area 355 is formed, the depth of the stepped area 355 corresponding to the difference in thickness between the top and bottom support frames 352 and the middle support frames 351.

According to the prior art, the middle support frames 351 of the filter block the supply port 217 of the valve housing. In addition, if the filter is positioned in the same circumferential direction as the supply port, the supply pressure of hydraulic fluid is changed, thereby causing an error in pressure control. Furthermore, foreign matters are accumulated between the supply port 217 of the valve housing and the filter, which may block the supply port. However, because the first and second stepped areas are formed on the valve body 345 and the filter 350 according to the present invention, respectively, a space 355 is formed between the supply port 217 of the valve housing and the support frames 351 of the filter, thereby avoiding the above-mentioned problems of the prior art.

As described above, by providing the inventive pressure control valve, the support frames of a filter for removing foreign matters from hydraulic fluid supplied from a supply port can be prevented from blocking the supply port. As a result, it is possible to minimize change of pressure at the filter area while assuring smooth supply of the hydraulic fluid. In addition, it is also possible to reduce the number of parts, the number of fabricating steps, and the material costs of such a pressure control valve.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A pressure control valve of an electronically controllable power steering apparatus comprising:
   a hollow valve body adapted to be press fit into a valve housing, the valve body including:
      a first stepped area with a predetermined depth, the first stepped area being formed as a recess in an outer circumferential surface of the valve body where a supply port is formed;
      an integrally formed solid closure portion at an upper end of the hollow valve body to close the hollow valve body;
      an engagement member formed at an upper end of the solid closure portion and having a diameter greater than a diameter of the hollow valve body thereby forming an engagement part that is adapted to engage an uppermost end of the valve housing; and
      a gripping part in the form of a male protuberance extending axially from a top surface of the engagement member, the gripping part adapted to facilitate fitting the valve body into the valve housing; and
   a filter fitted in the first stepped area of the valve body, the filter having a filter portion, top and bottom support frames, and one or more middle support frames, which are arranged in such a manner that a second stepped area recessed by a predetermined depth from an outer circumferential surface of the top and bottom support frames is formed by the top and bottom support frames and the middle support frames,
   wherein the second stepped area is defined on one side of said one or more middle support frames and the filter portion is arranged on another side of said one or more middle support frames.

2. A pressure control valve as claimed in claim 1, further comprising a second valve.

3. The pressure control valve as claimed in claim 1, wherein the gripping part includes a first portion extending from the engagement part and having a first diameter, and a second portion extending from the first portion and having a second diameter larger than the first diameter, the first and second diameters being less than a diameter of the engagement member.

4. The pressure control valve as claimed in claim 1, wherein the solid closure portion forms an internal anchoring part configured to engage and support an elastic member positioned within the hollow valve body.

5. The pressure control valve as claimed in claim 1, wherein the hollow valve body includes a cylindrical valve body and wherein the solid closure portion includes an outer diameter greater than an outer diameter of a remaining portion of the valve body.

6. The pressure control valve as claimed in claim 1, wherein the engagement member and the gripping part are adapted to extend beyond an uppermost end of the valve housing, the engagement part of the engagement member forming a flange that is adapted to engage a top surface of the uppermost end of the valve housing.

7. A pressure control valve of an electronically controllable power steering apparatus comprising:
   a hollow valve body adapted to be press fit into a valve housing, the valve body including:

a first stepped area with a predetermined depth, the first stepped area being formed as a recess in an outer circumferential surface of the valve body where a supply port is formed;

an integrally formed solid closure portion at an upper end of the hollow valve body to close the hollow valve body;

an engagement member formed at an upper end of the solid closure portion and having a diameter greater than a diameter of the hollow valve body thereby forming an engagement part that is adapted to engage an uppermost end of the valve housing; and a gripping part in the form of a male protuberance extending axially from a top surface of the engagement member, the gripping part adapted to facilitate fitting the valve body into the valve housing; and a filter fitted in the first stepped area of the valve body, the filter having top and bottom support frames, and one or more middle support frames, which are arranged in such a manner that a second stepped area recessed by a predetermined depth from an outer circumferential surface of the top and bottom support frames is formed by the top and bottom support frames and the middle support frames, wherein the gripping part includes a first portion extending from the engagement part and having a first diameter, and a second portion extending from the first portion and having a second diameter larger than the first diameter, the first and second diameters being less than a diameter of the engagement member.

* * * * *